United States Patent [19]
Klimko

[11] Patent Number: 5,048,614
[45] Date of Patent: Sep. 17, 1991

[54] METAL RE-ENFORCED RESILIENT HORSESHOE

[76] Inventor: John Klimko, 5318 Bayshore Ave., Cape Coral, Fla. 33904

[21] Appl. No.: 551,028
[22] Filed: Jul. 11, 1990
[51] Int. Cl.$^5$ .............................. A01L 1/04; A01L 7/04
[52] U.S. Cl. ................................. 168/29; 168/DIG. 1
[58] Field of Search ................. 168/4, 13, 29, DIG. 1

[56] References Cited

U.S. PATENT DOCUMENTS

| 514,753 | 2/1894 | Jerome | 168/4 |
|---|---|---|---|
| 561,217 | 4/1896 | Freyne . | |
| 779,757 | 7/1905 | Bartley . | |
| 3,050,133 | 3/1962 | Ketner et al. | 168/4 |
| 3,283,825 | 10/1965 | Ward | 168/29 |
| 3,310,115 | 5/1965 | Ward | 168/4 |
| 3,490,536 | 12/1968 | Hourlier | 168/4 |
| 3,603,402 | 9/1971 | McDonnell | 168/4 |
| 3,630,289 | 12/1971 | Norberg | 168/28 |
| 4,265,314 | 5/1981 | Tovim | 168/4 |
| 4,513,824 | 4/1985 | Ford | 168/4 |
| 4,690,222 | 9/1987 | Cameron | 168/4 |

FOREIGN PATENT DOCUMENTS

| 308309 | 3/1989 | European Pat. Off. | 168/4 |
|---|---|---|---|
| 872748 | 6/1942 | France | 168/29 |
| 2526630 | 11/1983 | France | 168/4 |
| 38654 | 7/1936 | Netherlands | 168/13 |

*Primary Examiner*—Robert P. Swiatek
*Attorney, Agent, or Firm*—Merrill N. Johnson

[57] ABSTRACT

A composite horseshoe made of a resilient urethane material and containing therein four separate, spaced apart metal inserts. The first metal insert forms a core in the shape of a horseshoe and lies entirely within the resilient horseshoe. The second and third metal inserts are relatively short elongated plates which lie above the two ends of the first metal insert, with the upper face of each plate lying flush with the surface of the resilient horseshoe. The fourth metal insert is a curved elongated plate called the toe grab which lies along the front of the resilient horseshoe and projects outwardly from the resilient horseshoe.

6 Claims, 1 Drawing Sheet

U.S. Patent  Sep. 17, 1991  5,048,614
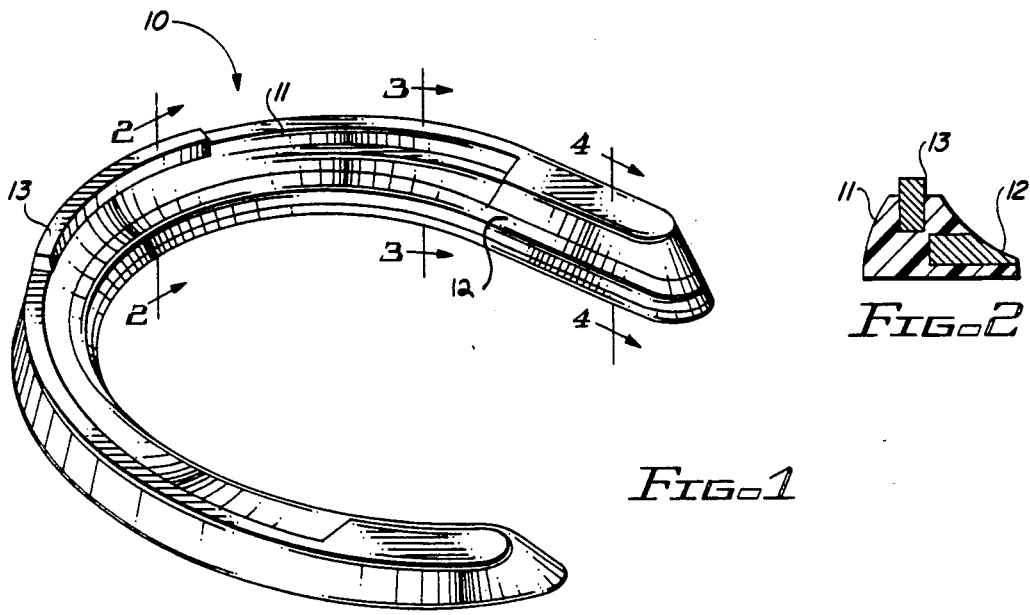
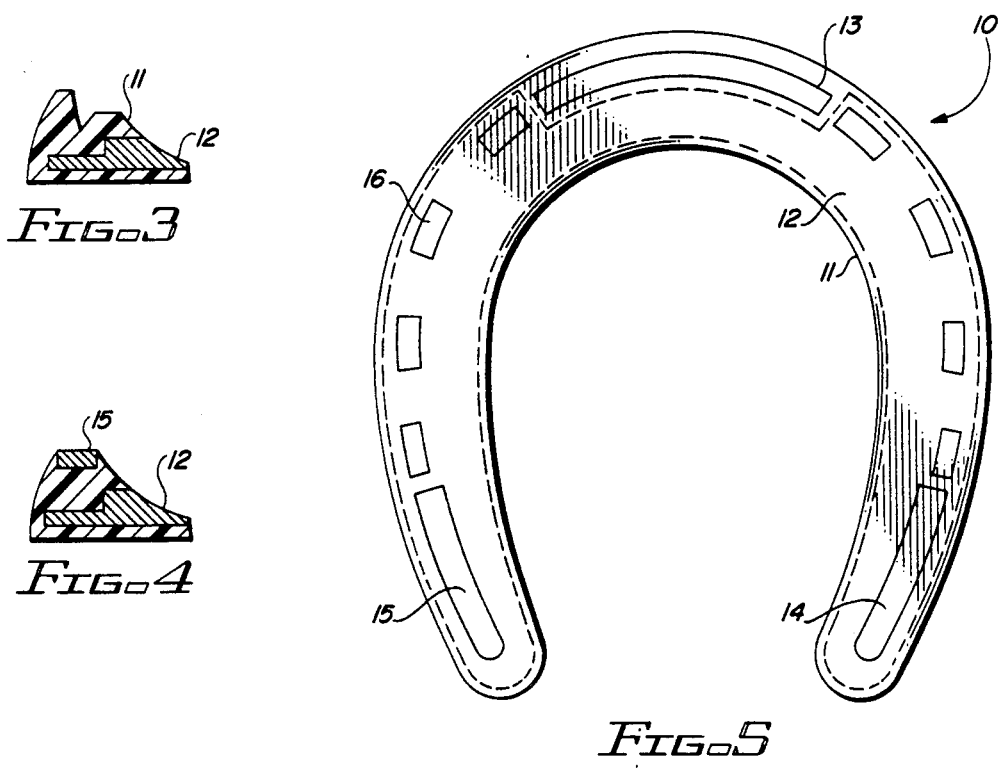

METAL RE-ENFORCED RESILIENT HORSESHOE

BACKGROUND AND SUMMARY OF THE INVENTION

My invention relates to horseshoes, and more particularly to horseshoes made of resilient material and re-enforced with metal inserts.

Those working with horses, especially horses bred for competition, are fimiliar with various attempts during the past 100 years to develop horseshoes made largely of different types of resilient materials in order to reduce the injuries to horse's legs due to the impact of their hooves, especially during races.

However, to date the use of horseshoes made mainly of various types of resilient material has been limited. The reason for this limited use is that until now all shoes containing resilient material put the resilient material only on the top or only on the bottom of a metal core and the metal toe grab on the front of the shoe was always in contact with the metal core and thus the shoe provided no shock absorbance at all.

Based upon over thirty years experience as a trainer and blacksmith with both thoroughbred and standard bred horses and a lot of experimentation with various materials and designs, I have invented a unique horseshoe which provides significant protection against injuries to all horses including racing, pacing, trotting and jumpers. My horseshoes have been tested on both tracks used for thoroughbreds and for standard bred horses (pacers and trotters) and the shoe wear as well as or better than standard metal shoes. Moreover, the cost of my new resilient shoes are not as expensive as some of the partially resilient shoes offered in the past.

Briefly, my resilient horseshoe is cast or molded from cyanaprene urethane or material of similar properties in the shape of a conventional metal horseshoe. The resilient shoe includes four metal inserts spaced apart from each other within the shoe to provide minimal shock to the horses's natural hoof from the surface of the track on which the horse is racing.

The first metal insert functions as a core to reinforce the urethane resilient shoe and is so shaped that the composite shoe can be shaped to the horse's foot but with the core having a cutout or indented portion at its front or toe position.

The metal core contains a plurality, preferably eight, nail holes so that my resilient shoe can be nailed to the horse's hoof in the same manner as conventional metal shoes.

The second and third metal inserts function to protect the two heel portions of the resilient shoe from excessive wear and each is shaped as an elongated flat plate lying above one of the two ends of the first insert with the upper face of each plate flush with the surface of the urethane shoe.

The fourth metal insert is a curved elongated plate called a toe grab which lies along the front or toe of the resilient shoe and projects outwardly from the resilient shoe. Since the toe grab is spaced or insulated from the horse's hoof by the body of resilient material, the shock taken by the toe grab as it strikes and digs into the surface of the track is cushioned by the resilient body of the shoe and thus the force transmitted to the hoof and leg of the horse is considerably lessened.

BRIEF DESCRIPTION OF THE DRAWINGS

FIG. 1 is a perspective view taken from above of my resilient horseshoe.

FIG. 2 is a cross-sectional view taken along the plane indicated by line 2—2 in FIG. 1.

FIG. 3 is a cross-sectional view taken along the plane indicated by line 3—3 in FIG. 1.

FIG. 4 is a cross-sectional view taken along the plane indicated by line 4—4 in FIG. 1.

FIG. 5 is a top plan view of my resilient horseshoe as illustrated in FIG. 1 showing in dotted lines the metal core embedded in the resilient shoe.

DETAILED DESCRIPTION OF THE PREFERRED EMBODIMENT

Referring to the drawings, there is shown in FIGS. 1 and 5 a preferred embodiment of my unique re-enforced resilient horseshoe 10. The main body 11 of shoe 10 is cast or molded of cyanaprene urethane in the shape of a conventional horseshoe.

While I prefer making main body 11 of cyanaprene urethane because of its high stability and resistance to deforming under repeated blows, other urethanes and other materials having similar physical properties may be used to form main body 11.

Resilient body 11 is re-enforced by a plurality of metal inserts which are spaced apart from each other. Preferably these inserts are made of steel, but other metals or high impact resistent plastics may be used. It is, however, essential to have the various inserts spaced apart from each other to achieve a composite shoe that properly protects the horse's hoof and leg from injury.

Insert 12 serves as a core which supports and reenforces the resilient urethane main body 11 and is shaped generally similar to main body 11 except being somewhat smaller as illustrated in FIGS. 3, 4 and 5. However, as best shown in FIG. 5, the front or toe portion of core 12 has a cutout or indented portion.

Core 12 also has eight rectangular nail holes 16 which permit my composite shoe to be nailed to the horse's hoof in the same way as a conventional metal shoe The second and third inserts are heel plates 14 and 15 shown in FIGS. 4 and 5. Plates 14 and 15 are elongated flat plates, each of which lies above one of the two ends of core 12 and serves to protect the heel portions of the resiliant main body 11 from excessive wear. The force of the impact between the upper surface of heel plates 14 and 15 and the surface of the track when the horse is running is not directly transmitted to the horse's hoof due to the cushioning effect of main body 11 lying between heel plates 14 and 15 and the horse's hoof.

The fourth insert is toe grab 13 illustrated in FIGS. 1, 2 and 5. As shown in these figures, toe grab 13 is an elongated curved plate whose lower portion is embedded in the front or toe of resilient main body 11 and whose upper portion projects upwardly from body 11. In order to provide an ample mass of resilient urethane material between toe grab 13 and the horse's hoof, the toe of core 11 contains a cut out toe portion as shown in FIGS. 2 and 5.

Toe grab 13 strikes and digs into the surface of the track with great force when the horse is running. It is thus essential that an adequate mass of resilient material lie between toe grab 13 and the horse's hoof so that the full force of the impact of the toe grab on the surface of the track is cushioned by the resilient material and not transmitted directly to the horse's hoof.

While the foregoing description and drawings fully set forth a preferred embodiment of my unique re-enforced resilient horseshoe, those skilled in the art may suggest numerous modifications and re-arrangements without departing from the scope and spirit of my invention. No limitations should be implied from the foregoing description and illustration since the scope of my invention is limited only by the appended claims.

I claim:

1. A composite horseshoe comprising
a main shoe formed from resilient material in the shape of a conventional horseshoe including a front toe portion and a pair of rear heel portions,
a metal core embedded within the main shoe which re-enforces and shapes the main shoe to the horse's foot,
a pair of similar heel plates, each lying within one of the heel portions of the main shoe with its upper flat surface flush with the surface of the main shoe and its lower surface spaced apart from the metal core, and
an elongated curved metal toe grab spaced apart from the core of the shoe and partially embedded in the toe of the main shoe and projecting upwardly from the toe of the resilient main shoe.

2. A composite horseshoe as set forth in claim 1 in which the core has a cut out indented toe portion to provide greater separation between the core and the toe grab.

3. A composite horseshoe as set forth in claim 1 in which the core contains a plurality of nail holes.

4. A composite horseshoe as set forth in claim 1 in which the metal core is shaped like the resilient main body but somewhat smaller.

5. A composite horseshoe comprising
a main shoe body formed of resilient material in the shape of a conventional horseshoe having a front toe portion and a pair of heel portions,
a metal core also shaped like a conventional horseshoe and embedded within the main shoe body to re-enforce the main shoe body, and
an elongated curved metal toe grab partially embedded in the toe of the resilient main shoe body and projecting upwardly away from the toe of the main shoe body,
that portion of the metal toe grab embedded in the toe of the resilient main shoe body being offset from and substantially spaced apart from the metal core whereby the force of the impact of the shoe's toe grab onto the earth is cushioned by the resilient material.

6. A composite horseshoe as set forth in claim 5 in which the main shoe body is made of urethane material and the core and the toe grab are made of steel.

* * * * *